United States Patent
Kim et al.

(10) Patent No.: US 12,211,261 B2
(45) Date of Patent: Jan. 28, 2025

(54) METHOD AND APPARATUS FOR TEXT-TO-IMAGE GENERATION USING SELF-SUPERVISED DISCRIMINATOR TO EXTRACT IMAGE FEATURE

(71) Applicant: POSTECH Research and Business Development Foundation, Pohang-si (KR)

(72) Inventors: Dai Jin Kim, Pohang-si (KR); Eun Yeong Jeon, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 352 days.

(21) Appl. No.: 17/741,407

(22) Filed: May 10, 2022

(65) Prior Publication Data

US 2023/0215162 A1 Jul. 6, 2023

(30) Foreign Application Priority Data

Dec. 30, 2021 (KR) .......................... 10-2021-0192681

(51) Int. Cl.
*G06V 10/86* (2022.01)
*G06T 9/00* (2006.01)
(Continued)

(52) U.S. Cl.
CPC .............. *G06V 10/86* (2022.01); *G06T 9/002* (2013.01); *G06V 10/40* (2022.01); *G06V 10/7747* (2022.01); *G06V 10/82* (2022.01)

(58) Field of Classification Search
CPC .... G06V 10/86; G06V 10/40; G06V 10/7747; G06V 10/774; G06V 10/82; G06T 9/002;
(Continued)

(56) References Cited

U.S. PATENT DOCUMENTS

2019/0236139 A1* 8/2019 DeFelice ................ G06N 3/044
2020/0372308 A1* 11/2020 Anirudh ............... G06V 10/764
(Continued)

FOREIGN PATENT DOCUMENTS

| KR | 10-2019-0080415 A | 7/2019 |
| KR | 10-2192015 B1 | 12/2020 |
| KR | 10-2287407 B1 | 8/2021 |

OTHER PUBLICATIONS

Liu, Bingchen, et al. "Towards faster and stabilized gan training for high-fidelity few-shot image synthesis," International Conference on Learning Representations. 2021, 22 pages.
(Continued)

*Primary Examiner* — Juan M Guillermety
(74) *Attorney, Agent, or Firm* — Morgan, Lewis & Bockius LLP

(57) ABSTRACT

An apparatus for text-to-image generation which is a self-supervised based on one-stage generative adversarial network and uses a discriminator network that extracts an image feature may comprise: a text encoder that extracts a sentence vector from input text; a discriminator that determines whether or not an image matches the text from the sentence vector and the image input from a generator; and a decoder that is connected to an encoder inside the discriminator, wherein the decoder and the encoder form an autoencoder structure inside the discriminator.

19 Claims, 5 Drawing Sheets

(51) Int. Cl.
*G06V 10/40* (2022.01)
*G06V 10/774* (2022.01)
*G06V 10/82* (2022.01)

(58) Field of Classification Search
CPC . G06T 11/00; G06T 7/001; G06T 9/00; G06T 2207/20081; G06T 2207/20084; G06T 2211/416; G06F 40/10; G06N 3/045
See application file for complete search history.

(56) References Cited

U.S. PATENT DOCUMENTS

| | | | |
|---|---|---|---|
| 2022/0044391 A1* | 2/2022 | Wallingford | G06N 3/045 |
| 2022/0067519 A1* | 3/2022 | Mishra | G06N 3/045 |
| 2022/0188602 A1* | 6/2022 | Meyer | G06N 3/045 |
| 2022/0215233 A1* | 7/2022 | Buehler | G06T 11/00 |
| 2022/0237368 A1* | 7/2022 | Tran | G06N 3/045 |

OTHER PUBLICATIONS

Tao, Ming, et al. "Deep fusion generative adversarial networks for text-to-image synthesis," arXiv preprint arXiv:2008.05865 (2021), 10 pages.

* cited by examiner

METHOD AND APPARATUS FOR TEXT-TO-IMAGE GENERATION USING SELF-SUPERVISED DISCRIMINATOR TO EXTRACT IMAGE FEATURE

CROSS-REFERENCE TO RELATED APPLICATIONS

This application claims priority to Korean Patent Application No. 10-2021-0192681, filed on Dec. 30, 2021, with the Korean Intellectual Property Office (KIPO), the entire contents of which are hereby incorporated by reference.

BACKGROUND

1. Technical Field

The present disclosure relates to image generation technology, and more particularly, to a method and apparatus for text-to-image generation using a discriminator network that extracts an image feature with a self-supervised generative adversarial network.

2. Related Art

Image generation and conversion technology is a core technology in the field of computer vision that can be variously applied to image editing, fashion design, and arts.

The most widely used method in the field of image generation technology is a generative adversarial network (GAN)-based method. A generative adversarial network uses a generator network and a discriminator network. The discriminator network is trained to determine whether an input image is a real image or a generated fake image, and the generator network is trained to generate images that are so real that they cannot be identified as fake by the discriminator network.

The GAN is also used in the text-to-image generation technology. The generator network of the text-to-image generation technology generates an image satisfying input text conditions, and the discriminator network performs the function of determining whether or not an input image and a text match. The text-to-image generation technology has been developed rapidly using the GAN.

However, current text-to-image generation technologies have difficulties in generating detailed parts such as shapes and textures of objects, although the generated images meet text conditions. This is because the learning method of the conventional generative adversarial network-based text-to-image generation technology depends only on whether or not the text and the image match and lacks visual information on which image the generator network should generate.

In addition, there is a method of using an additional pre-trained convolutional neural network when learning the text-to-image generation model, but there is a problem in that learning complexity increases due to the use of the additional network. In particular, since the additional network is a model trained to perform in other tasks, there is a problem of high memory usage.

SUMMARY

Accordingly, exemplary embodiments of the present disclosure are provided to substantially obviate one or more problems due to limitations and disadvantages of the related art.

The present disclosure is derived to solve the problems of the conventional art described above, and an object of the present disclosure is to provide an apparatus and method for text-to-image generation using a learning method that uses the features of a real image as a guideline for features that a generated fake image should have, so that the problem of inability to properly generate detailed information such as the structure and texture of objects in images in the conventional generative adversarial network-based text-to-image generation technology can be solved.

Another object of the present disclosure is to provide an apparatus and method for text-to-image generation which can efficiently generate a more plausible image using visual information without using an additional network.

According to an exemplary embodiment of the present disclosure, an apparatus for text-to-image generation which is a self-supervised based on one-stage generative adversarial network and uses a discriminator network that extracts an image feature may comprise: a text encoder that extracts a sentence vector from input text; a discriminator that determines whether or not an image matches the text from the sentence vector and the image input from a generator; and a decoder that is connected to an encoder inside the discriminator, wherein the decoder and the encoder form an autoencoder structure inside the discriminator.

The decoder may be connected to an intermediate layer in which a feature grid of a resultant image of a convolutional neural network of the encoder is a size of A×A.

The decoder may include a network that receives an image feature of the grid of the size of A×A as an input and generates a reconstruction image of a size of B×B.

The discriminator may be trained to determine whether or not an input image is a real image according to a text condition and an input of the image, and to determine a current learning result as a mismatch if the input image is not the real image, the discriminator may be trained to determine whether or not the text according to the text condition is a description of the image if the input image is the real image, and determine the current learning result as the mismatch if the text is not the description of the image, and the discriminator may be trained to determine the current learning result as a match and reconstruct a real input image by the encoder and the decoder in parallel if the input image is the real image and the text is the description of the image.

The generator to be connected to the discriminator may be trained to increase a similarity between the feature of the image generated by the discriminator and the feature of the real image.

The training for increasing the similarity may be performed to reduce a difference in a L1 distance between a feature value of a fake image generated by the generator and a feature value of the real image.

The generator may generate a fake image from the text condition and random noise.

According to another exemplary embodiment of the present disclosure, a method for text-to-image generation which is a self-supervised based on one-stage generative adversarial network and uses a discriminator that extracts an image feature may comprise: learning to determine whether or not an input image is a real image according to a text condition and an input of the image, and determine a current learning result as a mismatch if the input image is not the real image; learning to determine whether or not a text according to the text condition is a description of the image if the input image is the real image, and determine the current learning result as the mismatch if the text is not the description of the image; learning to determine the current learning result as a match if the input image is the real image and the text is the description of the image; and learning to reconstruct a real input image by an encoder inside the discriminator and a decoder connected to the encoder, in parallel with the step of learning to determine the learning result as the match.

The decoder may be connected to an intermediate layer in which a feature grid of a resultant image of a convolutional neural network of the encoder is a size of A×A.

The decoder may include a network that receives an image feature of the grid of the size of A×A as an input and generates a reconstruction image of a size of B×B.

The method may further comprise: generating a fake image from the text condition and random noise through a generator connected to the discriminator; and training the generator such that the fake image input to the discriminator is recognized by the discriminator as matching the text.

The generator may be trained to increase a similarity between the feature of the image generated by the discriminator and the feature of the real image.

The training for increasing the similarity may be performed to reduce a difference in a L1 distance between a feature value of the fake image and a feature value of the real image.

According to yet another exemplary embodiment of the present disclosure, an apparatus for text-to-image generation may comprise: a processor that is equipped with a discriminator that extracts an image feature through a self-supervised based on one-stage generative adversarial network; and a memory that is connected to the processor and stores at least one instruction, wherein the processor performs by the at least one instruction the steps of: learning to determine whether or not an input image is a real image through an encoder inside the discriminator, and determine a current learning result as a mismatch if the input image is not the real image, with respect to a sentence vector extracted from a text by a text encoder and inputted and a fake image or the real image input from a generator; learning to determine whether or not a text according to a text condition is a description of the image if the input image is the real image, and determine the current learning result as the mismatch if the text is not the description of the image; learning to determine the current learning result as a match if the input image is the real image and the text is the description of the image; and learning to reconstruct a real input image by the encoder and a decoder connected to the encoder, in parallel with the step of learning to determine the learning result as the match.

The decoder further installed to be connected to an intermediate layer of a convolutional neural network including the encoder may be connected to the intermediate layer in which a feature grid of a resultant image of the convolutional neural network is a size of A×A.

The decoder may include a network that receives an image feature of the grid of the size of A×A as an input and generates a reconstruction image of a size of B×B, and the B is greater than the A.

The processor may further perform the step of training a generator to generate the fake image such that the fake image input to the discriminator is recognized by the discriminator as matching the text.

The processor may further perform the step of training the generator to increase a similarity between the feature of the image generated by the discriminator and the feature of the real image.

The training for increasing the similarity may be performed to reduce a difference in a L1 distance between a feature value of the fake image and a feature value of the real image.

According to the present disclosure, the problem in the conventional text-to-image generation network that does not properly generate the structure or texture of an object because it does not directly use the visual information of the image is solved, and when generating an image from input text, it is possible to generate an image in which the structure or texture of an object in the image is fully expressed.

Therefore, according to the present disclosure, the feature of a real image is explicitly used as a guideline for the feature that a fake image should have, and, unlike the pre-trained additional network for image feature extraction, by using a network structure with an autoencoder inside a discriminator network, the discriminator network is trained with a generator network to learn more flexible features, and this allows the generator network to generate high-quality images.

DETAILED DESCRIPTION OF THE EMBODIMENTS

Figure 1:
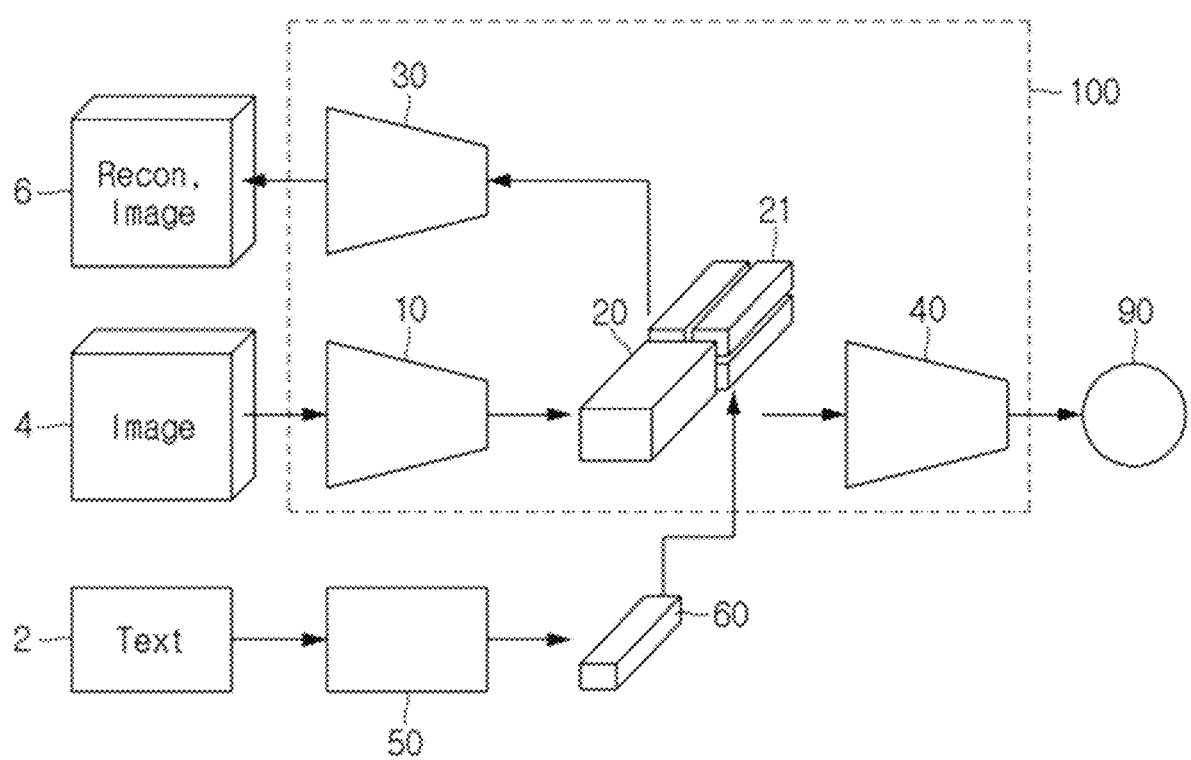
FIG. 1 is a schematic block diagram for explaining a discriminator network structure that can be employed in an apparatus for text-to-image generation according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

First, the characteristics of the present disclosure will be briefly described as follows.

In order to develop text-to-image generation technology that generates an image while preserving detailed visual parts such as shape and texture of an object, the present disclosure proposes a text-to-image generation network structure and learning method that extracts image features through a self-supervised generative adversarial network.

Unlike the conventional discriminator network, the discriminator network proposed in the present disclosure not only evaluates whether or not a text-image pair matches by receiving text and an image as inputs, but also serves as a network for extracting image features.

For efficient image feature extraction, a self-supervised learning structure in the form of an autoencoder is added inside the discriminator network. Therefore, by adding a decoder to the discriminator network, the discriminator network according to the present embodiment, that is, the discriminator network having an autoencoder structure therein, is efficiently configured, and the performance of the text-to-image GAN is improved by using this discriminator network.

FIG. 1 is a schematic block diagram for explaining a discriminator network structure that can be employed in an apparatus for text-to-image generation according to an exemplary embodiment of the present disclosure.

Referring to FIG. 1, an apparatus for text-to-image generation (T2I) uses a one-stage GAN, and is configured to include a text encoder 50, a generator and a discriminator (D) 100.

The text encoder 50 is a pre-trained text encoder, and may be a bi-directional long short-term memory (LSTM). In this case, the text encoder 50 may extract a semantic vector from an input text (Text) 2. Last hidden states of the extracted semantic vectors may be used as sentence vectors 52 and 60.

The generator generates an image 4 extracted from a noise vector sampled from a Gaussian distribution (Pz). The generated image 4 is input to the discriminator 100.

Unlike the conventional discriminator that determines whether or not the input image is real or fake, the discriminator 100 determines whether or not the image 4 and the text 2 match based on two inputs that are the sentence vector 52 inputted from the text encoder 50 and the image 4 inputted through the encoder 10 from the generator.

The discriminator 100 is a self-supervised discriminator, and is provided with an encoder 10 to which the image 4 is input, and a decoder 30 connected to the encoder 10 to receive a resultant feature value 20 of the encoder 10.

The above-described discriminator 100 is configured to receive the text 2 and the image 4 as inputs, and determine whether or not the image 4 and the text 2 match. That is, the discriminator 100 of the present embodiment is configured to additionally connect the decoder 30 to the encoder 10 in which the feature grid of the resultant image of the convolutional neural network is 16×16. The configuration of the discriminator 100 of this embodiment is different from the configuration of the conventional discriminator network that receives an image as an input, generates image features using the convolutional neural network, connects the generated image features and text embedding, and determines whether or not the image passed through the convolutional neural network matches the text.

If the convolutional neural network part, which is the front part of the decoder 30, is regarded as the encoder 10, the discriminator 100 of this embodiment becomes a structure in which an autoencoder is inside the discriminator network. The decoder 30 is a network that receives the image feature of 16×16 grid as an input and generates a reconstruction image 6 having a size of 256×256. The decoder 30 is included in the discriminator 100 in a broad sense, but may be regarded as an independent component in a narrow sense.

The convolutional neural network 40 performs learning based on the sentence vector 21 that is repeatedly input and concatenated to generate a determination result as to whether or not the image 4 matches the text 2. The generated determination result indicates match or mismatch at an output 90 through a fully connected output layer (FCOL) of the convolutional neural network 40.

Figure 2:
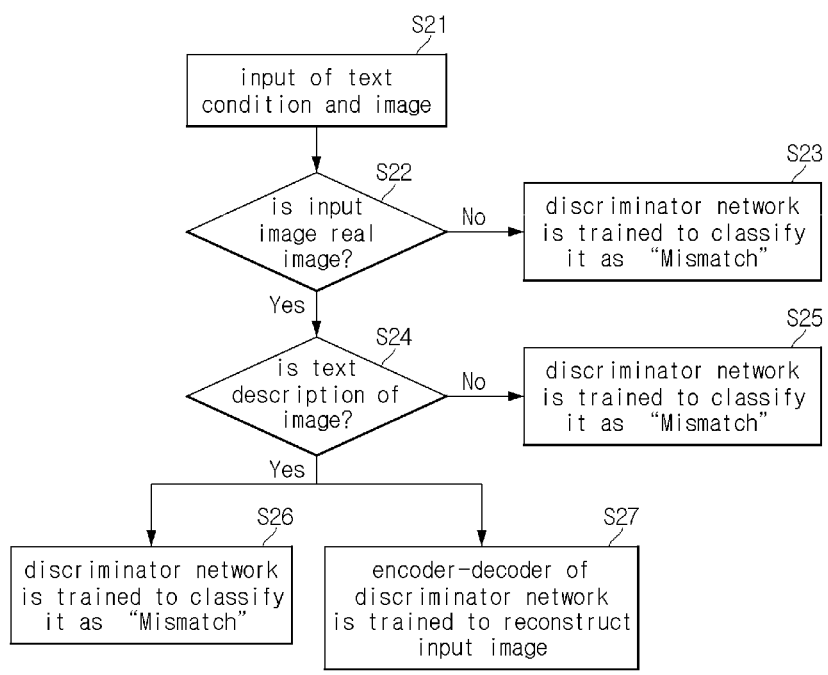
FIG. 2 is a flowchart illustrating a learning process of the discriminator network of FIG. 1.

FIG. 2 is a flowchart illustrating a learning process of the discriminator network of FIG. 1.

Referring to FIG. 2, for training the discriminator network, a text condition and an image are input to the discriminator network while the generator network is fixed (S21).

Next, it is determined whether or not the input image is a real image (S22). If the input image is not the real image as a result of the determination, the discriminator network is trained to classify it as a mismatch (S23).

Next, it is determined, when the input image is the real image, whether or not the text according to the text condition is a description of the image (S24). As a result of the determination, if the text is not the description of the image, the discriminator network is trained to classify it as a mismatch (S25).

Next, if the input image is the real image and the text is the description of the image, the discriminator network is trained to classify it as a match (S26).

In addition, if the input image is the real image and the text is the description of the image, the encoder-decoder of the discriminator network is trained to reconstruct the input image (S27).

The learning cases of the above-described discriminator network may be divided into three types.

The first type is the case in which an input image is a real image in a real dataset, and a text is also a description of the image. In this case, the discriminator network must determine that the image-text pair matches. The case in which the image and the text match may be expressed as 'Match' in the present embodiment.

The second type is a case in which the input image is the real image in the real dataset, but the text is a description not related to the image. In this case, the discriminator network must determine that the image-text pair does not match. In this embodiment, such a case may be expressed as 'Mismatch'.

The last type is a case in which the input image is not the real image but a generated image. In this case, no matter what the text explains, the discriminator network must determine that it is a 'Mismatch'. It is similar to the learning method of the conventional generative adversarial network in that the discriminator network determines whether or not the image-text pair matches.

On the other hand, in this embodiment, the discriminator network introduces an autoencoding learning process to extract better image features that are helpful to the generator network. That is, if the input image is an image in a real dataset, the convolutional neural network and decoder of the discriminator network are trained to reconstruct an original image again. In addition, if the input image is a fake image, it is meaningless to learn the image features, so the network can be trained to reconstruct the input image or terminate a current process according to the input of the fake image.

Figure 3:
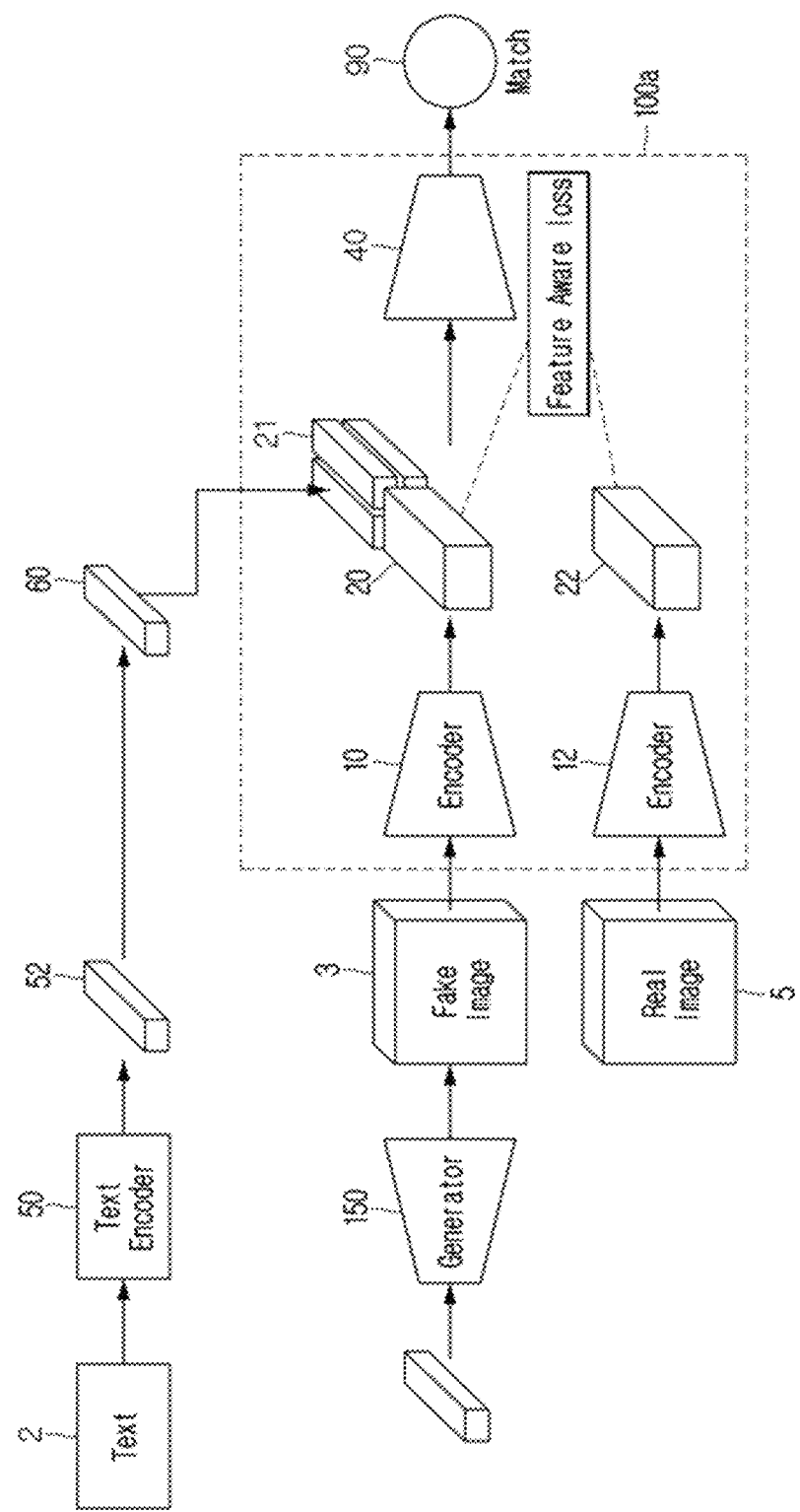
FIG. 3 is a schematic block diagram of a learning process of an apparatus for text-to-image generation according to an exemplary embodiment of the present disclosure.

FIG. 3 is a schematic block diagram of a learning process of an apparatus for text-to-image generation according to an exemplary embodiment of the present disclosure.

Referring to FIG. 3, the apparatus for text-to-image generation (T2I) includes a text encoder 50, a discriminator 100, and a generator 150. The discriminator 100 of this embodiment is illustrated in a form in which a decoder is omitted.

The text 2 is converted into sentence embedding through the pre-trained text encoder 50 and the sentence vector 52.

The discriminator 100 is substantially the same as the discriminator 100 described above with reference to FIGS. 1 and 2. The discriminator 100 determines whether or not the image matches the text 2 based on the input image and the sentence embedding input from the text encoder 50.

The generator 150 generates an image feature of 4×4 grid by using a linear layer and tensor shape conversion with an embedding value connecting a text condition and a random noise 3. The image feature of the 4×4 grid goes through an upsampling block 6 times, that doubles the size of the grid to make it an image feature of 256×256 grid, and finally, can be generated using the convolutional neural network as the image 4a with a size of 256×256.

In the generative adversarial network, the learning objective of the generator 150 is to deceive the discriminator 100.

Therefore, when the fake image 4a generated by the generator 150 and the text 2 corresponding thereto are input to the discriminator 100, the generator 150 is trained to recognize that the discriminator 100 matches.

Further, in order to learn visual information more explicitly, the learning method of the generator network can be applied to increase the similarity between the feature 20 of the generated image obtained by the encoder 10 or 12 of the discriminator 100 and the feature 22 of the real image corresponding thereto.

Here, the loss function between the two features may be called 'Feature-Aware loss'. There are several learning methods to increase the similarity between two features. Among them, a method that minimizes the difference in the L1 distance between feature values may be adopted.

Figure 4:
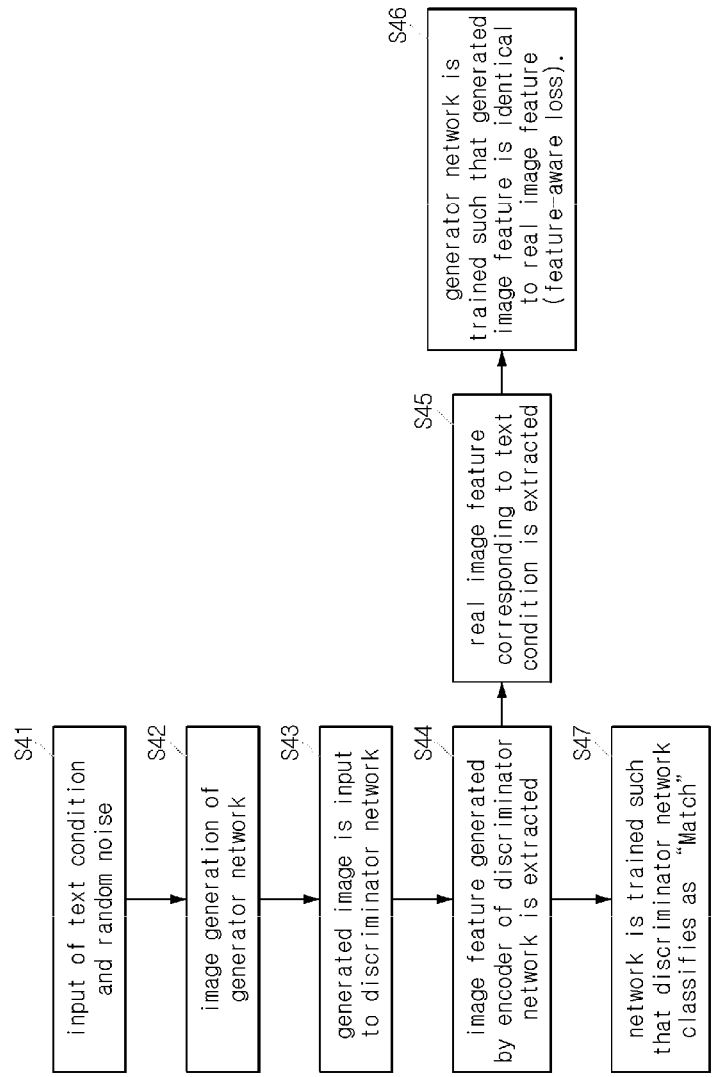
FIG. 4 is a flowchart illustrating a learning process of the generator network of the apparatus for text-to-image generation of FIG. 3.

FIG. 4 is a flowchart illustrating a learning process of the generator network of the apparatus for text-to-image generation of FIG. 3.

Referring to FIG. 4, in a state where the discriminator network is fixed, a text condition and a random noise are input for training the generator (S41). The text determines what should be generated in the image, and the noise controls what is not in the text information.

For example, if the text states 'a brown cat is on the desk.', the generator must generate an image that matches it, and the type and posture of the cat that are not in the text and the color of the desk are changed by noise.

In the case of the neural network model of the generator, it must have the ability to generate various images even under one condition, and this requirement can be satisfied with noise.

When text and noise are input to the generator network, the text is converted into a sentence embedding including a sentence vector through a pre-trained text encoder. The generator network generates the image feature of 4×4 grid by using a linear layer and tensor shape conversion with the embedding value connecting the converted sentence embedding and noise. The image feature of the 4×4 grid is made into the image feature of 256×256 grid by passing through an upsampling block that doubles the size of the grid 6 times, and can be finally generated using the convolutional neural network as the image with the size of 256×256 (S42).

In the generative adversarial network, the learning objective of the generator network is to deceive the discriminator network. Accordingly, the image generated by the generator network and the text corresponding thereto are input to the discriminator network (S43). Then, the generator network is trained such that the discriminator network recognizes that the image matches the text.

In order to learn visual information more explicitly, the feature of the generated image obtained by the encoder of the discriminator network is extracted (S44). A real image feature corresponding to the text condition is extracted from the previously extracted generated image (S45).

Then, the generator network is trained using a learning method that increases the similarity between the feature of the generated image and the feature of the real image (S46). The loss function used in this learning method may be called a 'Feature-Aware loss'. In the present embodiment, among various methods that can be adopted as a learning method of increasing the similarity between features, the method of reducing the difference between the L1 distances of the feature values to the smallest is adopted, but the method is not limited thereto.

In addition, when the feature of the generated image obtained by the encoder of the discriminator network is extracted, in parallel with the process of training the generator network in a way that reduces feature-aware loss, the discriminator network may be trained so that the discriminator network determines as a match.

According to this embodiment, the discriminator network extracts the feature of an image using the convolutional neural network. The extracted image feature calculates whether or not the input image matches the text through the convolutional neural network, and on the other hand, when the input image is not a generated image but an image that exists in a dataset, the input image is reproduced through the decoder. By the self-supervised learning method of the autoencoder that regenerates an original input value, the discriminator network is trained to extract image features more efficiently.

In addition, the generator network is trained such that the discriminator network is prevented from discriminating whether the generated image is fake, and the similarity between the meaningful feature of the real image obtained by the discriminator network and the feature of the generated image is increased to compensate for the lack of visual information. Through this, since it can learn what visual feature the fake image should be generated with, the fake image can be generated while better preserving the texture of the image and the shape of an object.

Figure 5:
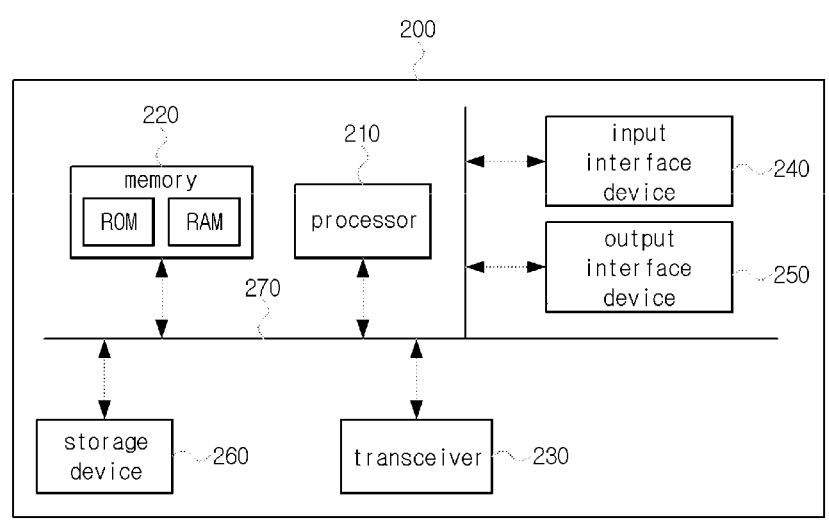
FIG. 5 is a block diagram for explaining the main configuration of an apparatus for text-to-image generation according to another exemplary embodiment of the present disclosure.

FIG. 5 is a block diagram for explaining the main configuration of an apparatus for text-to-image generation according to another exemplary embodiment of the present disclosure.

Referring to FIG. 5, an apparatus for text-to-image generation (T2I) 200 is a type of computer device, and may include at least one processor 210, a memory 220 and a transceiver 230 connected to a network to perform communication. In addition, the apparatus for T2I generation 200 may further include an input interface device 240, an output interface device 250, a storage device 260, and the like. Each of the components included in the apparatus for T2I generation 200 may be connected by a bus 270 to communicate with each other.

The processor 210 may refer to a central processing unit (CPU), a graphics processing unit (GPU), or a dedicated processor on which methods according to embodiments of the present disclosure are performed. Each of the memory 220 and the storage device 260 may be configured as at least one of a volatile storage medium and a non-volatile storage medium. For example, the memory 220 may be configured as at least one of a read only memory (ROM) and a random access memory (RAM).

In addition, the processor 210 may execute a program instruction stored in at least one of the memory 220 and the storage device 260. The program instruction may include an instruction to input a text condition and an image to the discriminator network, an instruction to determine whether or not the input image is a real image, an instruction to train the network such that the discriminator network classifies it as a mismatch if the determination result is not the real image, an instruction to determine whether or not the text according to the text condition is a description of the image if the input image is the real image, an instruction to train the network such that the discriminator network classifies it as a mismatch if the text is not the description of the image in the determination result, an instruction to train the network such that the determinator network classifies it as match if the input image is the real image and the text is the description of the image, and an instruction to train the network such that the encoder-decoder of the determinator network reconstructs the real input image if the input image is the real image and the text is the description of the image.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An apparatus for text-to-image generation which is a self-supervised based on one-stage generative adversarial network and is for using a discriminator network that extracts an image feature, the apparatus comprising:
   a text encoder configured to extract a sentence vector from input text;
   a discriminator configured to determine whether or not an image matches a text from the sentence vector and the image input from a generator; and
   a decoder that is connected to an encoder inside the discriminator,
   wherein the decoder and the encoder form an autoencoder structure inside the discriminator, and
   wherein an encoder-decoder of the autoencoder structure is trained to reconstruct the input image when the image is a real image in a real dataset and the text is a description of the image, in training the discriminator.

2. The apparatus for text-to-image generation according to claim 1, wherein the decoder is connected to an intermediate layer in which a feature grid of a resultant image of a convolutional neural network of the encoder is a size of A×A.

3. The apparatus for text-to-image generation according to claim 2, wherein the decoder includes a network that is configured to receive an image feature of the grid of the size of A×A as an input and generate a reconstruction image of a size of B×B.

4. The apparatus for text-to-image generation according to claim 1, wherein the discriminator is for being trained to determine whether or not the input image is a real image, and to determine a current learning result as a mismatch if the input image is not the real image,
   the discriminator is for being trained to determine whether or not the text is the description of the image if the input image is the real image, and determine the current learning result as the mismatch if the text is not the description of the image, and
   if the input image is the real image and the text is the description of the image, the discriminator is trained to determine the current learning result as a match, and in parallel, the discriminator is trained to reconstruct a real input image by the encoder and the decoder.

5. The apparatus for text-to-image generation according to claim 4, wherein the generator to be connected to the discriminator is for being trained to increase a similarity between the feature of the image generated by the discriminator and the feature of the real image reconstructed by the encoder-decoder.

6. The apparatus for text-to-image generation according to claim 5, wherein the training for increasing the similarity is performed to reduce a difference in a L1 distance between a feature value of a fake image generated by the generator and a feature value of the real image.

7. The apparatus for text-to-image generation according to claim 5, wherein the generator is configured to generate a fake image from the text and random noise.

8. A method for text-to-image generation which is a self-supervised based on one-stage generative adversarial network and uses a discriminator that extracts an image feature, the method comprising:
    learning, by a processor of an apparatus for text-to-image generation, for a discriminator of the generative adversarial network to determine whether or not an input image is a real image, and determine a current learning result as a mismatch if the input image is not the real image;
    learning, by the processor, for the discriminator to determine whether or not a text according to a text condition is a description of the image if the input image is the real image, and determine the current learning result as the mismatch if the text is not the description of the image;
    learning, by the processor, for the discriminator to determine the current learning result as a match if the input image is the real image and the text is the description of the real image; and
    learning, by the processor, to reconstruct the input image by an encoder inside the discriminator and a decoder connected to the encoder, in parallel with learning for the discriminator to determine the current learning result as the match.

9. The method for text-to-image generation according to claim 8, wherein the decoder is connected to an intermediate layer in which a feature grid of a resultant image of a convolutional neural network of the encoder is a size of A×A.

10. The method for text-to-image generation according to claim 9, wherein the decoder includes a network that receives an image feature of the grid of the size of A×A as an input and generates a reconstruction image of a size of B×B.

11. The method for text-to-image generation according to claim 8, further comprising:
    generating a fake image from the text condition and random noise through a generator connected to the discriminator; and
    training the generator such that the fake image input to the discriminator is recognized by the discriminator as matching the text.

12. The method for text-to-image generation according to claim 11, wherein the generator is trained to increase a similarity between the feature of the image generated by the discriminator and the feature of the real image reconstructed by the decoder and the encoder that form an autoencoder structure.

13. The method for text-to-image generation according to claim 12, wherein the training for increasing the similarity is performed to reduce a difference in a L1 distance between a feature value of the fake image and a feature value of the real image.

14. An apparatus for text-to-image generation, comprising:
    a processor that is equipped with a discriminator configured to extract an image feature through a self-supervised based on one-stage generative adversarial network; and
    a memory that is connected to the processor and stores at least one instruction,
    wherein the processor is configured to perform by the at least one instruction:
    learning for the discriminator to determine whether or not an input image is a real image through an encoder inside the discriminator, and determine a current learning result as a mismatch if the input image is not the real image, with respect to a sentence vector extracted from a text by a text encoder and inputted and a fake image or the real image input from a generator;
    learning for the discriminator to determine whether or not a text is a description of the image if the input image is the real image, and determine the current learning result as the mismatch if the text is not the description of the image;
    learning for the discriminator to determine the current learning result as a match if the input image is the real image and the text is the description of the real image; and
    learning to reconstruct the input image by the encoder and a decoder connected to the encoder, in parallel with learning for the discriminator to determine the current learning result as the match.

15. The apparatus for text-to-image generation according to claim 14, wherein the decoder further installed to be connected to an intermediate layer of a convolutional neural network including the encoder is connected to the intermediate layer in which a feature grid of a resultant image of the convolutional neural network is a size of A×A.

16. The apparatus for text-to-image generation according to claim 15, wherein the decoder includes a network that is configured to receive an image feature of the grid of the size of A×A as an input and generate a reconstruction image of a size of B×B, and the B is greater than the A.

17. The apparatus for text-to-image generation according to claim 14, wherein the processor is further configured to perform training a generator to generate the fake image such that the fake image input to the discriminator is recognized by the discriminator as matching the text.

18. The apparatus for text-to-image generation according to claim 17, wherein the processor is further configured to perform of training the generator to increase a similarity between the feature of the image generated by the discriminator and the feature of the real image reconstructed by the decoder and the encoder that form an autoencoder structure.

19. The apparatus for text-to-image generation according to claim 18, wherein the training for increasing the similarity is for being performed to reduce a difference in a L1 distance between a feature value of the fake image and a feature value of the real image.

* * * * *